Figure 1:
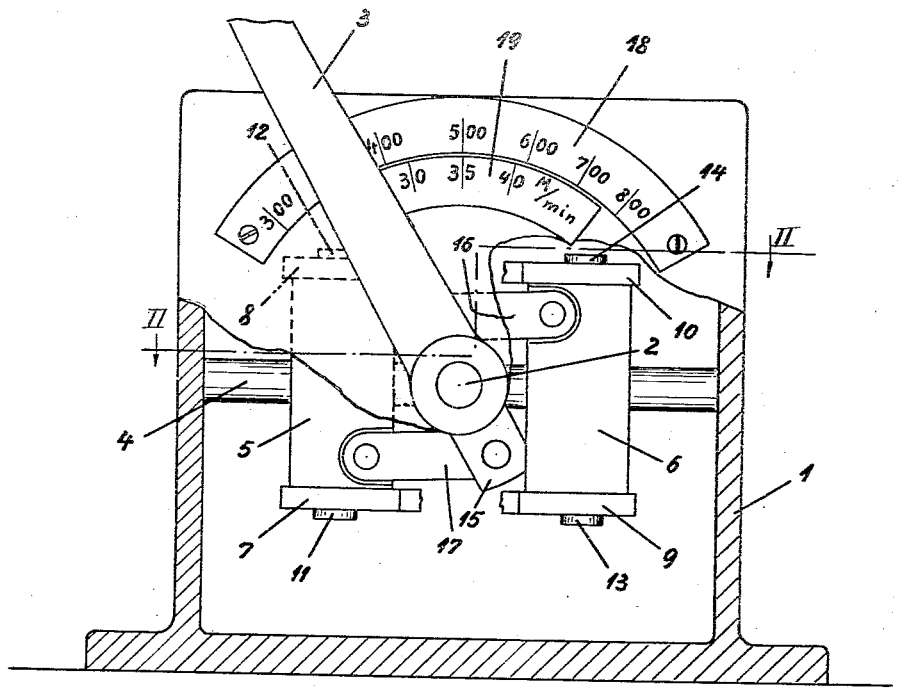

Inventor:
Albrecht Maurer
by [signature]
Atty.

July 7, 1936.  A. MAURER  2,046,397

CHANGE SPEED GEAR

Filed Aug. 10, 1932  3 Sheets-Sheet 3

Inventor:
Albrecht Maurer
by
Atty.

UNITED STATES PATENT OFFICE 2,046,397

CHANGE-SPEED GEAR

Albrecht Maurer, Bad Homburg vor der Hohe, Germany, assignor to Link-Belt Company, Chicago, Ill., a corporation of Illinois Application August 10, 1932, Serial No. 628,158
In Germany August 13, 1931

8 Claims. (Cl. 116—124)

My invention relates to change-speed gears. It is an object of my invention to provide a change-speed gear in which the relation of the ratio for which the gear is regulated (i. e. the speed imparted to its driven member) to some other value, is indicated directly.

To this end I provide a movable scale which is connected to the mechanism for varying the ratio of the gear, and a fixed scale with which the movable scale is adapted to cooperate. One of the scales indicates the speed imparted to the driven member of the gear, and the other scale indicates the other value.

For instance, if my change-speed gear is applied to a machine tool, for which purpose it is primarily designed, one of the scales which may be the fixed or the movable one, as desired, indicates the cutting speed and the other scale indicates various diameters of the work piece or of a rotary tool, for instance, a grinding wheel. In this manner suitable cutting speeds are selected for work pieces, or tools, of various diameters.

Let $n$ be the speed (revs. per min.) at which the work piece, or a rotary tool, such as a grinding wheel, rotates, $d$ the diameter of the work piece, or the tool (millimetres) and $u$ the cutting speed (metres per min.) then $$u = nd\pi \tag{1}$$

This equation establishes a relationship between the cutting speed $u$ and the speed $n$ at which the work piece (or rotary tool) rotates. As the diameter corresponding to a given speed of the work piece is a function of its speed, one of the scales referred to indicates the diameters and not the speeds of several work pieces or several diameters of a single work piece. However, such a scale is only true for a given cutting speed and if the machine tool is operated at another cutting speed, another scale is required. The necessity of providing as many scales as there are cutting speeds, is eliminated by a logarithmic graduation of the cutting-speed scale. Let $n_1$ be a given speed of the work piece, and $u_1$ the corresponding cutting speed, and let $n_0$ be another speed of a work piece, and $u_0$ the corresponding cutting speed, then $$\frac{n_1}{n_0} = \frac{u_1}{u_0} \tag{2}$$

and $$\log n_1 = \log n_0 + \log \frac{u_1}{u_0} \tag{3}$$

A scale graduated for a given cutting speed in conformity with Equation (3) may be used for any other cutting speed if a scale carrying the logarithm of the ratio of the two speeds is substituted. It has already been suggested to use logarithmic scales of this kind for operating change-speed gears. In such devices, a scale is provided for various diameters of the work piece in combination with the aforesaid logarithmic scale of cutting speeds, but they require two operations, i. e. setting the cutting-speed scale for the corresponding diameter and regulation of the change-speed gear in conformity with the indicated cutting speed. This increases the strain on the operator, particularly if pieces of various diameters are tooled or cut in rapid succession, or if the work piece is repeatedly surfaced.

It has been suggested to provide automatic means for displacing the cutting-speed scale in accordance with the diameter scale but such means are not only complicated and expensive but also interfere with the chucking means, and in some cases are even impracticable. Besides, only one diameter, and the corresponding speed, can be read at a time which is a serious drawback, particularly in the case of wrong setting of the scales.

These drawbacks are eliminated according to my invention in which one of the scales which may be the diameter scale or the cutting-speed scale, is fixed and the other is movable and connected to the mechanism for varying the ratio of the gear, preferably to its regulating lever. If the cutting-speed scale is in a given position with respect to the diameter scale its indications will register with a corresponding number of diameters on the diameter scale and therefore several cutting speeds and diameters corresponding to each other are read immediately. It will be understood that only a single operation is required for setting the scales and for regulating the change-speed gear, and that complicated mechanisms, such as provided in the old devices referred to, are dispensed with.

My novel change-speed gear is not only very simple but its operation is easy and does not require particular skill or attention on the part of the operator, thus eliminating mistakes, loss of time, and scrap.

The regulating lever for the change-speed gear in the case of a logarithmic scale must be so connected to the mechanism for varying the ratio of the gear that the movement of the scale corresponds to the variation in the speed of the gear by a logarithmic law. This principle may be applied in a particularly simple manner to gears of the type in which pairs of cone pulleys are mounted for axial displacement on the driving and driven shafts, and connected by a belt.

Let $x$ be the radial displacement of the belt from the position in which it runs on equal diameters in the two pairs of cone pulleys, and let N be the speed of the driven, and N' be the speed of the driving shaft, then $$N = N' \frac{1+x}{1-x} \qquad (4)$$

This equation may be developed as follows:

$$\log \frac{N}{N'} = \log e^2 \left( x + \frac{x^3}{3} + \frac{x^5}{5} + \cdots \right) \qquad (5)$$

By omitting the terms of higher order in Equation (5), the following equation is obtained:

$$\log \frac{N}{N'} = \log e^2 \cdot x \qquad (6)$$

For practical values of $x$, the error is less than 1%.

Equation (6) shows that the logarithm of the speed N of the driven shaft, if the speed N' of the driving shaft is constant, is directly proportional, to the above approximation, to the constant value of $x$ while $x$, in turn, is proportional to the axial displacement of the cone pulleys. Consequently the lever or other means for regulating the change-speed gear may be so connected to the mechanism for varying its ratio that its movement is proportional to the axial displacement of the cone pulleys.

In the drawings affixed to this specification and forming part thereof cone-pulley gears and scales embodying my invention are illustrated diagrammatically by way of example.

In the drawings

Figure 2:
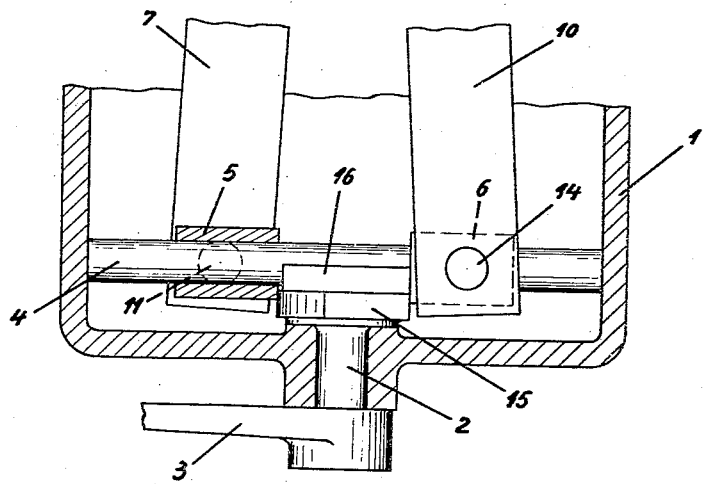
Figure 3:
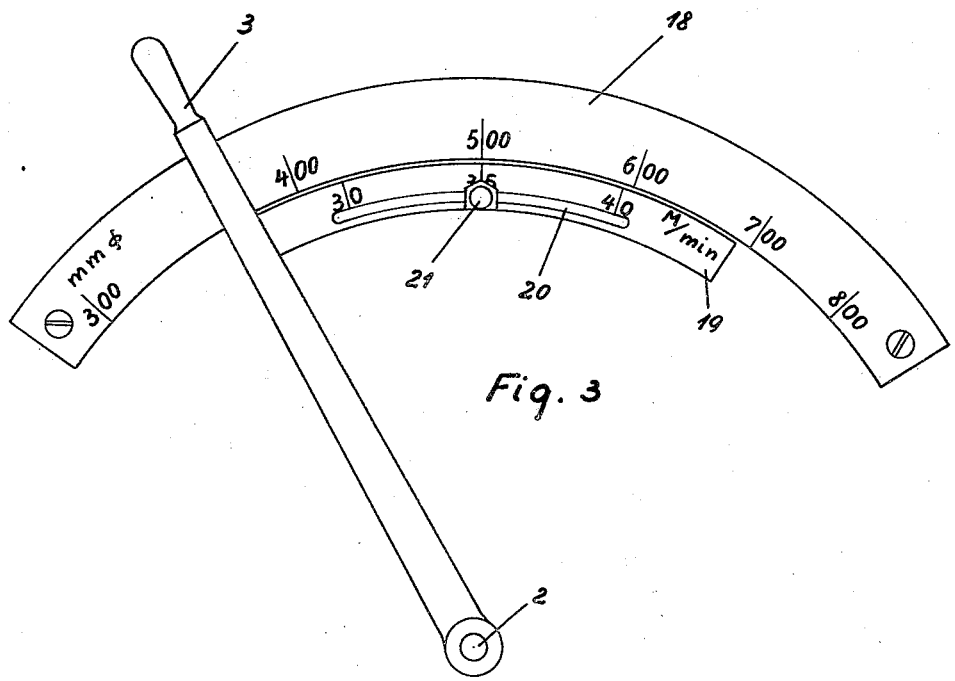
Figure 4:
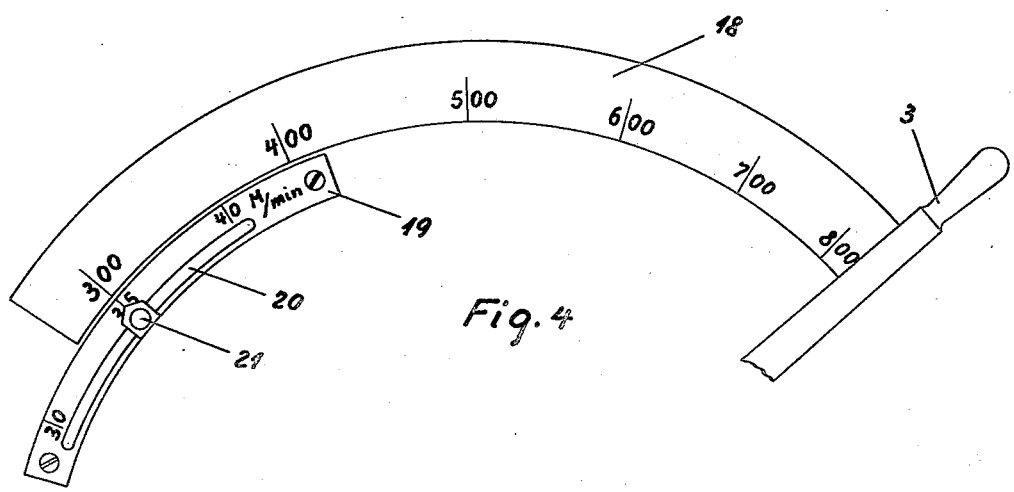
Figure 5:
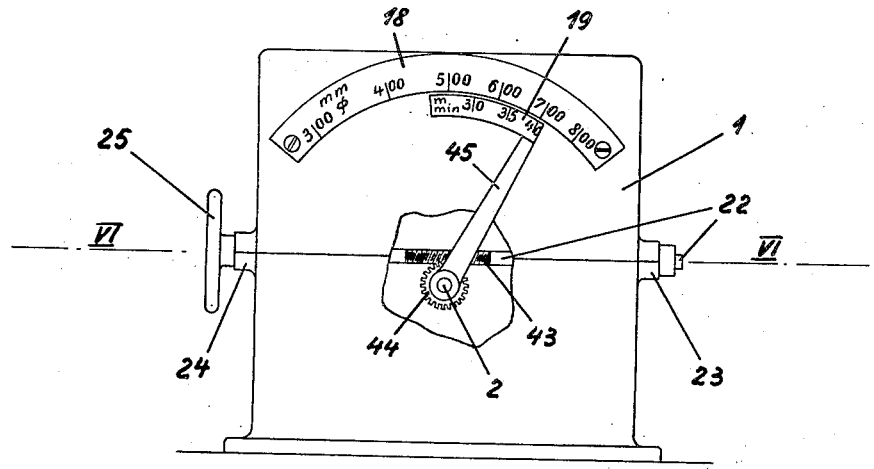
Figure 6:
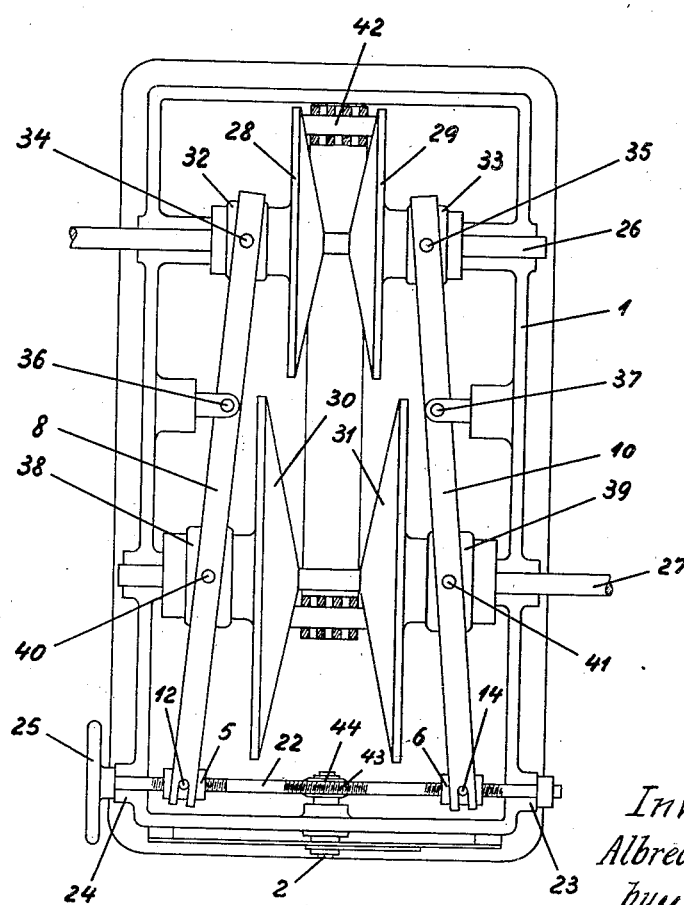

Fig. 1 is an elevation of a gear in which the regulating lever is connected to the means for shifting the cone pulleys by means of links, the cutting-speed scale is secured to the regulating lever, and the diameter scale is fixed, the front wall of the gear box being partly broken away, Fig. 2 is a section on the line II—II in Fig. 1, Fig. 3 shows an arrangement of the diameter and cutting-speed scales which is substantially similar to that illustrated in Fig. 5, drawn to a larger scale, Fig. 4 shows an arrangement also drawn to a larger scale, in which the diameter scale is connected to the regulating lever and the cutting-speed scale is fixed, Fig. 5 is an elevation showing the front wall of the gear box partly broken open, Fig. 6 is a section on the line VI—VI in Fig. 5, showing a complete cone-pulley gear in which the means for shifting the cone pulleys are operated by a threaded spindle and the cutting-speed scale is secured to an arm to which rocking movement is imparted from the spindle through the medium of a worm gear.

Referring now to the drawings, and first to Figs. 1 and 2, 1 is a gear box, 2 is a shaft which is mounted to rotate in a bearing on the front wall of the casing, and 3 is the regulating lever which is secured on the shaft 2. 4 is a slide bar in the gear box 1, 5 and 6 are slide blocks on the slide bar 4, 7, 8 are a pair of pulley-shifting levers for the cone pulleys at one side of each pair, the cone pulleys themselves being not shown in these figures, and 9 and 10 are a pair of similar levers for shifting the cone pulleys at the other side, the free ends of the pairs of controlling levers being pivoted to the blocks at 11, 12 and 13, 14, respectively. 15 is a double-armed lever on the shaft 2 and 16 and 17 are links connecting the ends of the lever respectively to the blocks 6 and 5. 18 is the diameter scale on which diameters are indicated in millimetres and which is secured to the front wall of the gear box 1, and 19 is the cutting speed scale on which three cutting speeds are indicated in metres per min. and which is secured to the regulating lever 3.

Fig. 3 shows the arrangement of scales illustrated in Fig. 1, drawn to a larger scale. The scale 19 is slotted at 20 and equipped with a pointer 21 which is mounted to move in the slot 20 for marking one of the three cutting speeds.

In the arrangement illustrated in Fig. 4 the diameter scale 18 is secured to the regulating lever 3 and the cutting-speed scale 19 is fixed on the gear box 1.

Referring now to Figs. 5 and 6, these illustrate a complete gear, with the cone pulleys which had been omitted in Figs. 1 and 2. The gear box 1 with the shaft 2 and the pairs 7, 8 and 9, 10 of pulley-shifting levers, are provided as described with reference to Figs. 1 and 2 but in this instance the blocks 5 and 6 are placed on the threaded portions of a spindle 22 which is mounted in bearings 23 and 24 in the side walls of the gear box 1 and is rotated by a hand wheel 25.

26 is the driving, and 27 is the driven shaft of the change-speed gear, 28 and 29 are a pair of cone pulleys on the driving shaft 26, and 30, 31 are a pair of cone pulleys on the driven shaft 27. 32 and 33 are neck rings on the bosses of the pulleys 28 and 29, respectively, to which the rear ends of the shifting levers 7, 8 and 9, 10 are connected by pins 34 and 35, respectively, each pair of the levers being fulcrumed at the side walls of the gear box at 36 and 37, respectively, with their free ends engaging the pins 11, 12 and 13, 14 of the respective blocks 5 and 6. 38 and 39 are neck rings on the bosses of the pulleys 30 and 31, respectively, which are connected to the control levers by pins 40 and 41, respectively. 42 is the belt by which the pairs of pulleys are connected, which may be a link belt as illustrated. 43 is a worm on the spindle 22, and 44 is a worm wheel on the shaft 2 which meshes with the worm 43. 45 is an arm on the end of the shaft 2 which projects from the front wall of the gear box 1. The cutting-speed scale is secured to the arm 45 for cooperation with the fixed diameter scale 18.

In the gears and scales illustrated in Figs. 1 to 4 the pulleys 28, 29 and 30, 31 are operated or adjusted by turning the lever 3 on the shaft 2. The rotation of the shaft 2 is transmitted to the pairs of controlling levers 7, 8 and 9, 10 through the medium of the links 16 and 17 and the gear is regulated for a given speed. The lever is turned until the desired cutting speed, for instance, 35 metres per min., Fig. 1, on the scale 19 is opposite the diameter of the work piece, for instance, 500 millimetres, on the scale 19. The driven shaft 27 of the gear now rotates at the speed required for tooling the work piece of 500 millimetres diameter at the cutting speed of 35 metres per min.

In the gear illustrated in Figs. 5 and 6 the cone pulleys are adjusted by rotating the hand wheel 25 until the desired cutting speed (40 metres per min.) on the scale 19 is in line with the corresponding diameter of the work piece (700 millimetres) on the scale 18.

I wish it to be understood that I do not desire to be limited to the exact details of construction shown and described for obvious modifications will occur to a person skilled in the art.

I claim:—

1. In a change-speed gear, mechanism for varying the speed ratio of the gear, a movable scale connected to said mechanism, and a fixed scale with which said movable scale is adapted to cooperate, to indicate the relationship between diameter of work piece and speed of rotation, the two scales being positioned adjacent each other for relative movement and combined with a single index positioned for reading on both scales.

2. In a change-speed gear for machine tools in which the tooling operation includes the rotation of a member, mechanism for varying the speed ratio of the gear, a movable scale connected to said mechanism, and a fixed scale with which said movable scale is adapted to cooperate to indicate the relationship between diameter of work piece and speed of rotation, the two scales being positioned adjacent each other for relative movement and combined with a single index positioned for reading on both scales, one of said scales indicating various diameters of said rotary member, and the other being a logarithmic scale of cutting speeds.

3. In a change-speed gear for machine tools in which the tooling operation includes the rotation of the work piece, mechanism for varying the speed ratio of the gear, a movable scale connected to said mechanism, and a fixed scale with which said movable scale is adapted to cooperate to indicate the relationship between diameter of work piece and speed of rotation, the two scales being positioned adjacent each other for relative movement and combined with a single index positioned for reading on both scales, one of said scales indicating various diameters of the work piece, and the other being a logarithmic scale of cutting speeds.

4. In a change-speed gear, a driving shaft, a driven shaft, a pair of cone pulleys mounted for axial displacement on each shaft, a belt connecting said pulleys, mechanism for axially displacing the pulleys in each pair, a movable scale, means for connecting said scale to said mechanism in such manner that its movement is proportional to the axial displacement of said pulleys, and a fixed scale with which said movable scale is adapted to cooperate to indicate the relationship between diameter of work piece and speed of rotation, the movable scale being positioned for movement close to, and alongside of, the fixed scale to permit the graduations of one scale to be read against the other scale.

5. In a change-speed gear, a driving shaft, a driven shaft, a pair of cone pulleys mounted for axial displacement on each shaft, a belt connecting said pulleys, mechanism including a lever and links for axially displacing the pulleys in each pair, a movable scale connected to said lever, and a fixed scale with which said movable scale is adapted to cooperate, to indicate the relationship between diameter of work piece and speed of rotation, the two scales being positioned adjacent each other for relative movement and combined with a single index positioned for reading on both scales.

6. In a change-speed gear, a driving shaft, a driven shaft, a pair of cone pulleys mounted for axial displacement on each shaft, a belt connecting said pulleys, mechanism including a threaded spindle, for axially displacing the pulleys in each pair, a movable scale, means including a worm gear operatively connected to said spindle for connecting said scale to said mechanism, and a fixed scale with which said movable scale is adapted to cooperate, to indicate the relationship between diameter of work piece and speed of rotation, the two scales being positioned adjacent each other for relative movement and combined with a single index positioned for reading on both scales.

7. The combination with a drive mechanism, comprising a driving and a driven member and means for varying their rotation to alter the speed of the driven member, a fixed scale, a speed adjustment control lever, a movable scale mounted to move with said lever relative to said fixed scale, the two scales calibrated to co-operate to indicate the desired relationship between speed of rotation and diameter of work piece, the two scales being positioned adjacent each other for relative movement and combined with a single index positioned for reading on both scales.

8. The combination with a drive mechanism, comprising a driving and a driven member and means for varying their rotation to alter the speed of the driven member, a fixed scale, a speed adjustment control lever, a movable scale mounted to move with said lever relative to said fixed scale, the two scales calibrated to co-operate to indicate the desired relationship between speed of rotation and diameter of work piece, both scales being logarithmic, the two constituting a slide rule associated with the speed control lever, said slide rule being operated by said speed control lever to accomplish simultaneously the calculation of the relationship between the diameter and speed and the adjustment of speed, the two scales being positioned adjacent each other for relative movement and combined with a single index positioned for reading on both scales.

ALBRECHT MAURER.